(12) United States Patent
Murase

(10) Patent No.: US 6,517,941 B1
(45) Date of Patent: Feb. 11, 2003

(54) COATING COMPOSITION

(75) Inventor: Naokazu Murase, Shizuoka (JP)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/582,007

(22) PCT Filed: Oct. 20, 1999

(86) PCT No.: PCT/JP99/05793

§ 371 (c)(1),
(2), (4) Date: Sep. 15, 2000

(87) PCT Pub. No.: WO00/23533

PCT Pub. Date: Apr. 27, 2000

(30) Foreign Application Priority Data

Oct. 20, 1998 (JP) ............................... 10/298613

(51) Int. Cl.$^7$ ................................. B32B 9/02
(52) U.S. Cl. .................. 428/412; 428/447; 524/588; 524/837; 524/858
(58) Field of Search .................. 524/588; 523/181; 428/412, 447

(56) References Cited

U.S. PATENT DOCUMENTS

| 4,025,474 A | * | 5/1977 | Porter et al. ................ 525/160 |
| 4,344,800 A | * | 8/1982 | Lutz ........................... 106/481 |
| 4,535,138 A | * | 8/1985 | Ratkowski et al. ......... 428/542.8 |
| 5,169,715 A |   | 12/1992 | Maubert et al. |
| 5,298,335 A |   | 3/1994 | Reed et al. |
| 5,371,147 A | * | 12/1994 | Spinelli et al. ............. 525/288 |
| 5,411,807 A | * | 5/1995 | Patel et al. ................. 428/412 |
| 5,468,801 A | * | 11/1995 | Antonelli et al. ........... 524/504 |
| 5,503,935 A | * | 4/1996 | Patel ........................... 428/412 |
| 5,585,407 A | * | 12/1996 | Patel et al. ................. 424/409 |
| 5,670,242 A |   | 9/1997 | Asano et al. |
| 5,799,978 A |   | 9/1998 | Grinnell |
| 5,985,424 A |   | 11/1999 | DeMatte et al. |
| 6,103,387 A | * | 8/2000 | Yamamoto et al. ......... 427/387 |

FOREIGN PATENT DOCUMENTS

| JP | 54030225 A | * | 3/1979 |
| JP | 54081338 A | * | 6/1979 |
| JP | 55066940 A | * | 5/1980 |
| JP | 01223188 A | * | 6/1989 |

* cited by examiner

*Primary Examiner*—Margaret Medley
(74) *Attorney, Agent, or Firm*—Scott E. Hanf

(57) ABSTRACT

An object of the present invention is to provide a coating composition with which it is possible to make coated paper that is excellent in various properties such as glossiness, water resistance, solvent resistance, heat resistance, thermal blocking resistance and ink penetration and that can readily be recycled. This object of the invention can be attained by a coating composition comprising a hydrosol emulsion and colloidal silica, wherein the hydrosol emulsion is obtained by neutralizing, with an alkali, a synthetic resin emulsion prepared by dispersing, in water, particles of a synthetic resin having carboxyl group and an alkoxysilyl group.

11 Claims, No Drawings

COATING COMPOSITION

BACKGROUND OF THE INVENTION

1. Field of the Invention

The present invention relates to a coating composition that is applied to the surface of a substrate to make coated paper.

2. Related Art

Paper is living necessaries, and has long been used for various purposes. In recent years, value-added coated or laminated paper excellent in various properties such as water resistance, glossiness, solvent resistance and heat resistance is extensively made by subjecting paper to a treating or finishing process, for example, a coating or laminating process, proper to the intended use of the paper.

Owing to an increase in the number of office automation apparatus such as computers, ink-jet printers have widely been spread. It is now very common to conduct color printing to produce photographic images or the like of good image quality. Recording paper for ink-jet printers is required to be excellent in not only such physical properties as glossiness and water resistance but also ink penetration. To make such recording paper more penetrate to aqueous inks for use in ink-jet printing, silica is often mixed into the hydrophilic binder component of a coating composition that is applied to the surface of paper to make recording paper for ink-jet printing. However, the recording paper coated with such a coating composition is disadvantageous in that it is poor in water resistance.

To improve the water resistance of recording paper for ink-jet printers, extensive studies have been made so far. For instance, there has been made such a proposal that a binder having high water resistance and colloidal silica are mixed into a coating composition useful for making recording paper in order to reconcile ink penetration with water resistance in the recording paper.

Although such recording paper is excellent in both ink penetration and water resistance, it is not easy to recycle the recording paper. As public concern for environmental problem as grown, the recycling of paper has become an important issue in recent years. The above recording paper has such a shortcoming hat it requires great cost for its recycling.

SUMMARY OF THE INVENTION

The present inventor has now found that recording paper excellent in glossiness, water resistance, solvent resistance, heat resistance, thermal blocking resistance, and ink penetration. can be obtained by the use of a coating composition comprising a specific hydrosol emulsion and colloidal silica. The present inventor has also found that, since paper coated with such a coating composition is readily soluble in an alkali, it is easy to dispose the coated paper after use as regenerable waste. The present invention has been made based on these findings.

An object of the present invention is therefore to provide a coating composition with which it is possible to make coated paper that is excellent in such properties as glossiness, water resistance, solvent resistance, heat resistance, thermal blocking resistance and ink penetration and that can readily be recycled.

A coating composition according to the present invention comprises a hydrosol emulsion and colloidal silica, wherein the hydrosol emulsion is obtained by neutralizing, with an alkali, a synthetic resin emulsion prepared by dispersing, in water, particles of a synthetic resin having carboxyl group and an alkoxysilyl group.

DETAILED DESCRIPTION OF THE INVENTION

Coating Composition

The coating composition according to the present invention is useful for making coated paper, especially one required to have high gloss, high resistance to water and heat, and good ink penetration essential to ink-jet printing. Paper coated with the coating composition of the present invention can readily be recycled after use.

In the coating composition according to the present invention, the synthetic resin particles and the colloidal silica are combined through the alkoxysilyl group contained in the synthetic resin to form a colloidal-silica-combined hydrosol emulsion. By virtue of the existence of this composite, paper coated with the coating composition shows high gloss and excellent resistance to water, solvents and heat. In addition, it is believed that, since this composite swells and dissolves in an alkali in the course of the disposal of the coated paper for recycling, the recycling of the coated paper can easily be achieved.

The coating composition of the present invention comprises, at least, a specific hydrosol emulsion and colloidal silica.

(a) Hydrosol Emulsion

The hydrosol emulsion for use in the present invention is obtained by neutralizing, with an alkali, a synthetic resin emulsion prepared by dispersing, in water, particles of a synthetic resin having carboxyl group and an alkoxysilyl group.

In the present invention, the synthetic resin emulsion can be prepared by subjecting, at least, a (meth)acrylic alkyl ester, an ethylenically unsaturated carboxylic acid, and an organoalkoxysilane having radically polymerizable unsaturated bond to emulsion polymerization. Alternatively, the synthetic resin emulsion can also be obtained by subjecting, at least, a (meth)acrylic alkyl ester and an ethylenically unsaturated carboxylic acid to emulsion polymerization, and mixing the polymer produced and an organoalkoxysilane having no radically polymerizable unsaturated bond.

Any purposive technique selected properly can be used for conducting the emulsion polymerization. Examples of methods of emulsion polymerization include a batch process in which water, a surfactant serving as an emulsifier and a monomer component are charged to a polymerizer, the temperature of the mixture is raised, and proper additives such as a polymerization initiator are added to the mixture to make the polymerization proceed; a monomer-dosing process in which water and a radically polymerizable surfactant serving as an emulsifier are charged to a polymerizer, the temperature of the mixture is raised, and a monomer component is added dropwise to the mixture; and an monomer emulsion dosing process in which, in the above monomer-dropping process, the monomer component is firstly emulsified by the use of a surfactant serving as an emulsifier and water, and the emulsion formed is added dropwise to the mixture.

By conducting emulsion polymerization by such methods, it is possible to obtain the synthetic resin emulsion in which particles of a synthetic resin having carboxyl group and an alkoxysilyl group are dispersed in water.

The synthetic resin emulsion obtained is neutralized with an alkali to obtain the hydrosol emulsion. This neutralization can be conducted through the application of a conventional technique or operation for neutralization properly selected. An alkali of any purposive type can be used for the neutralization in a proper amount, and an aqueous sodium hydroxide solution or ammonia, for example, may be used.

In the present invention, the (meth)acrylic alkyl ester is a monomer that will constitute the skeleton of the synthetic resin to be used for preparing the above-described synthetic resin emulsion, and any purposive one can be used. Examples of such (meth)acrylic alkyl esters include methyl acrylate, ethyl acrylate, propyl acrylate, butyl acrylate, 2-ethylhexyl acrylate, hydroxyethyl acrylate, hydroxypropyl acrylate, hydroxybutyl acrylate, methyl methacrylate, ethyl methacrylate, propyl methacrylate, n-butyl methacrylate, t-butyl methacrylate, iso-butyl methacrylate, 2-ethylhexyl methacrylate, cyclohexyl methacrylate and cyclohexyl acrylate. These alkyl esters can be used either singly or in combination of two or more members.

In the present invention, it is preferable to use a hydroxyl-group-containing (meth)acrylic alkyl ester. This is because, when such an alkyl ester is used, the resultant coated paper swells and dissolves in an alkali more easily, so that it is possible to recycle the coated paper more easily and successfully. When a hydroxyl-group-containing (meth)acrylic alkyl ester is used as the (meth)acrylic alkyl ester, the synthetic resin emulsion prepared is to contain hydroxyl group in addition to the carboxyl group and the alkoxysilyl group. Thus, the synthetic resin emulsion for use in the coating composition according to the present invention is preferably one in which the particles of a synthetic resin contained in the emulsion further contains hydroxyl group.

Examples of such hydroxyl-group-containing (meth) acrylic alkyl esters include hydroxyethyl methacrylate, hydroxyethyl acrylate, hydroxypropyl methacrylate, hydroxypropyl acrylate, hydroxybutyl methacrylate and hydroxybutyl acrylate. These alkyl esters may be used either singly or in combination of two or more members. Of these, hydroxyethyl or hydroxypropyl methacrylate is preferably used in the present invention because paper coated with the resultant coating composition swells and dissolves in an alkali more easily.

The amount of the hydroxyl-group-containing (meth) acrylic ester to be used is preferably from 1 to 30 parts by weight, more preferably from 3 to 10 parts by weight for 100 parts by weight of the nonvolatile matter of the hydrosol emulsion. It is preferable to use the hydroxyl-group-containing (meth)acrylic ester in an amount of 1 part by weight or more because the resultant coating composition sufficiently swells and dissolves in an alkali. To use this ester in an amount of 30 parts by weight or less is preferred because paper coated with the resultant coating composition shows high water resistance. By the term "nonvolatile matter of the hydrosol emulsion" is herein meant the solid components in the emulsion, specifically the residue that remains after the emulsion has been dried at 105° C. for 1 hour.

For the ethylenically unsaturated carboxylic acid, any purposive one selected properly can be used in the present invention. Examples of such ethylenically unsaturated carboxylic acids include acrylic acid, methacrylic acid, itaconic acid, crotonic acid and maleic acid. These acids can be used either singly or in combination of two or more members. Of these, methacrylic acid is preferably used in the present invention because it shows good copolymerizability, and paper coated with the resultant coating composition sufficiently swells and dissolves in an alkali.

The amount of the ethylenically unsaturated carboxylic acid to be used is preferably from 5 to 30 parts by weight, more preferably from 10 to 20 parts by weight for 100 parts by weight of the nonvolatile matter of the hydrosol emulsion. It is preferable to use the ethylenically unsaturated carboxylic acid in an amount of 5 parts by weight or more because paper coated with the resultant coating composition sufficiently swells and dissolves in an alkali, and the recycling of such coated paper can thus be achieved easily. To use the ethylenically unsaturated carboxylic acid in an amount of 30 parts by weight or less is preferred because paper coated with the resultant coating composition shows high resistance to water.

In the present invention, the organoalkoxysilane is preferably a compound having radically polymerizable unsaturated bond, represented by the following formula (1) or (2):

R—Si (X)$_3$                         (1)

R—Si(R')(X)$_2$                   (2)

wherein R represents an organic group having such a group as vinyl, (meth)acryloxy, epoxy, mercapto, amino or isocyanate group, R' represents a lower alkyl group having 1 to 3 carbon atoms, and X represents methoxyl or ethoxyl group, which has radically polymerizable unsaturated bond.

Examples of such organoalkoxysilanes having radically polymerizable unsaturated bond include vinylorganoalkoxysilanes such as vinyltrimethoxy-silane, vinylmethyldimethoxysilane, vinyldimethylmethoxysilane, vinyltrimethoxysilane, vinyl(2-methoxyethoxy)silane and vinyltriacetoxysilane; epoxyorganoalkoxysilanes such as γ-methacryloxypropyltrimethoxysilane, 3,4-epoxycyclohexylethyltrimethoxysilane and 3,4-epoxycyclohexylethyl-dimethoxysilane; mercaptoorganoalkoxysilanes such as γ-mercaptopropyl-trimethoxysilane; γ-methacryloxypropyltrimethoxysilane; and γ-methacryl-oxypropyltriethoxysilane. These compounds can be used either singly or in combination of two or more members. Of these, 3-methacryloxypropyl-triethoxysilane is preferred in the present invention from the viewpoint of polymerizability.

The amount of the organoalkoxysilane having radically polymerizable unsaturated bond to be used is preferably from 0.1 to 10 parts by weight, more preferably from 0.5 to 5 parts by weight for 100 parts by weight of the nonvolatile matter of the hydrosol emulsion. When the organoalkoxysilane having radically polymerizable unsaturated bond is used in an amount of 0.1 parts by weight or more, the organoalkoxysilane is fully combined with colloidal silica, so that paper coated with the resultant coating composition can show high water resistance. When the amount of the organoalkoxysilane used is 10 parts by weight or less, such troubles can be avoided that the polymerization cannot proceed stably, that a lot of coagula are formed and that the viscosity of the polymerization system is unfavorably increased. When the organoalkoxysilane is used in an amount within the above-described range, the organoalkoxysilane is fully combined with colloidal silica to form a composite, so that paper coated with the resultant coating composition is excellent in both water resistance and solvent resistance.

In the present invention, it is also possible to use an organoalkoxysilane having no radically polymerizable unsaturated bond. Examples of such organoalkoxysilanes include 3-glycidoxypropyl-trimethoxysilane, 3-glycidoxypropylmethyldimethoxysilane, 3-chloropropyl-propylmethyldimethoxysilane and 3-chloropropyltrimethoxysilane.

It is preferable to use such an organoalkoxysilane having no radically polymerizable unsaturated bond in an amount of 0.1 to 10 parts by weight, more preferably 0.5 to 5 parts by weight for 100 parts by weight of the nonvolatile matter of the hydrosol emulsion.

The coating composition of the present invention can further comprise other optional components. Examples of useful optional components include monomers copolymerizable with the above-described (meth)acrylic alkyl ester, ethylenically unsaturated carboxylic acid and organoalkoxysilane having radically polymerizable unsaturated bond, cross-linkable monomers, surfactants, polymerization initiators, chain transfer agents, aqueous media, pH modifiers, thickeners, anti-freezing agents, anti-foaming agents, preservatives, pigments such as fillers, coloring agents such as dyes and coloring pigments, and other known additives such as ultraviolet absorbers. These optional components can be used either singly or in combination of two or more members.

Examples of the above copolymerizable monomers include ethylene, aromatic vinyl compounds such as vinyl chloride, vinylidene chloride, styrene and methyl styrene, vinyl esters such as vinyl acetate, vinyl propionate, and vinyl esters of branched carboxylic acids (Veoba), vinyl phosphate, acrylonitrile, acrylamide, N-methylol acrylamide, glycidyl methacrylate, 2-hydroxyalkyl acrylates and alkoxyethyl acrylates. These monomers can be used either singly or in combination of two or more members. Of these, styrene is preferred in the present invention as a comonomer from the viewpoints of water resistance and glossiness.

Preferred examples of cross-linkable monomers include monomers having two or more polymerizable unsaturated groups. Examples of such monomers having two or more polymerizable unsaturated groups include divinyl compounds, di(meth)acrylate compounds, tri(meth)acrylate compounds, tetra(meth)acrylate compounds, diallyl compounds, triallyl compounds and tetraallyl compounds. Preferred examples of these monomers specifically include divinylbenzene, divinyl adipate, ethylene glycol di(meth) acrylate, diethylene glycol di(meth)acrylate, triethylene glycol di(meth)acrylate, polyethylene glycol di(meth)acrylate, polypropylene glycol di(meth)acrylate, neopentyl glycol di(meth)acrylate, 1,3-butylene glycol di(meth)acrylate, 1,3-butyl di(meth)acrylate, trimethylolethane tri(meth)acrylate, trimethylolpropane tri(meth)acrylate, dipentaerythritol tri (meth)acrylate, diallyl phthalate, triallyl dicyanurate, and tetraallyloxyethane. These monomers can be used either singly or in combination of two or more members. Further, in the present invention, it is also possible to use these cross-linkable monomers in addition to the above-described copolymerizable monomers.

Surfactants that can be used in the present invention as optional components are those ones that can act as emulsifiers in emulsion polymerization. Specific examples of such surfactants include conventional anionic or nonionic surfactants. To impart increased water resistance to the resultant coated paper, it is also possible to use, as the reactive-surfactants, those ones containing in their molecules one or more radically polymerizable unsaturated groups. These surfactants are used for the polymerization in the form of a mixture.

The amount of the surfactants to be used is preferably about 0.3 to 10% by weight, more preferably about 1.0 to 5.0% by weight of the total amount of the monomers used.

When the surfactants are used in an amount of 0.3% by weight or more, such troubles are hardly caused that the reaction system coagulates and that the reaction is not completed. When the amount of the surfactants used is 10% by weight or less, such a trouble is avoided that the viscosity of the reaction system is excessively increased, and paper coated with the resultant coating composition shows high water resistance.

A polymerization initiator radically decomposes by the action of heat or a reducing substance to make the addition polymerization of monomers proceed. Examples of useful polymerization initiators include water- or oil-soluble persulfates, peroxides and azobis compounds. Specific examples of these polymerization initiators include potassiumpersulfate, ammonium persulfate, t-butyl hydroperoxide, hydrogen peroxide, azobisisobutyronitrile (AIBN), Rongalite, and sodium metabisulfite. These polymerization initiators can be used either singly or in combination of two or more members. Transition-metal ions are used along with these polymerization initiators, and ferric sulfate, cupric chloride and ferric chloride are preferred as the transition-metal ions.

Any chain transfer agent properly selected from known ones can be used in the present invention. Examples of chain transfer agents include alcohols such as methanol, ethanol, propanol and butanol, carboxylic acids having 2 to 8 carbon atoms such as acetone, methyl ethyl ketone, cyclohexane, acetophenone, acetaldehyde, propionic aldehyde, n-butyl aldehyde, furfural and benzaldehyde, and mercaptans such as dodecyl mercaptan, lauryl mercaptan, normal mercaptan, thioglycolic acid, octyl thioglycolate and thioglycerol. These chain transfer agents can be used either singly or in combination of two or more members.

Any purposive aqueous medium properly selected can be used. Examples of aqueous media include water and aqueous alcoholic solutions. Of these, water is preferred from the viewpoints of handling properties, cost, etc. Any water, for example, tap water or ion-exchanged water can be used.

The glass transition temperature (Tg) of the polymer contained in the hydrosol emulsion is preferably from 0 to 100° C., more preferably from 20 to 80° C. When the polymer has a glass transition temperature of 0° C. or higher, a film of the resultant coating composition has no stickiness, so that it does not suffer decrease in blocking resistance and stain resistance. When the polymer has a glass transition temperature of 100° C. or lower, the resultant coating composition has good film-forming properties, and thus forms a clear film.

In the course of the formation of a film, the synthetic resin emulsion generally goes through such a process that resin particles in the emulsion fuse to one another. The temperature at which this fusion thoroughly occurs to form a film that appears uniform when observed visually is called minimum film-forming temperature (hereinafter referred to as "MFT"). The MFT is greatly affected by the glass transition temperature (Tg) of a polymer; a polymer having a high Tg can neither easily form a film nor fully reveal its inherent physical properties. In the present invention, the hydrosol emulsion is obtained by neutralizing the synthetic resin emulsion with an alkali, and this neutralization brings about swelling and dissolution of the surfaces of the emulsion particles. For this reason, even if the Tg of the polymer is high, the MFT does not become extremely high in proportion to the high Tg. Polymers having wide-ranging Tg can thus be used in the present invention.

(b) Colloidal Silica

The colloidal silica for use in the present invention is preferably a colloidal sol of ultrafine silica particles dispersed in water. It is preferable that the particle diameters of primary particles in this sol be in the range of 5 to 20 nm and that the shape of the primary particles be globular.

In the present invention, the colloidal silica may be either commercially available one, or one whose surface has been treated with a metal ion such as metaaluminate ion. Further, the colloidal silica may be monodisperse silica, or one in which particles are linked in the form of beads or in a branched configuration. Of these, colloidal silica whose surface has been treated with a metal ion such as metaaluminate ion is preferably used in the present invention because such colloidal silica can be stably mixed with other materials.

The colloidal silica is used in an amount of preferably 10 to 200 parts by weight, more preferably 20 to 150 parts by weight for 100 parts by weight of the nonvolatile matter of the hydrosol emulsion. When the colloidal silica is used in an amount of 10 part by weight or more, paper coated with the resultant coating composition shows high gloss, high water resistance and good ink penetration. When the colloidal silica is used in an amount of 200 part by weight or less, the resultant coating composition shows good film-forming properties, and can thus function well as a coating composition. When the amount of the colloidal silica used falls within the above range, a layer formed by applying the coating composition has good ink penetration and high blocking resistance, and also shows high resistance to thermal blocking when subjected to calendering.

(c) Process for Producing Coating Composition

The coating composition of the present invention can easily be produced by uniformly mixing, through the application of a conventional stirring means or the like, the hydrosol emulsion and colloidal silica in predetermined amounts. In the coating composition of the present invention, the hydrosol emulsion containing carboxyl group and an alkoxysilyl group, excellent in various physical properties is combined with the colloidal silica. The coating composition therefore shows stable physical properties and excellent handling properties.

Coated Recording Medium

Another embodiment of the present invention is a coated recording medium that can be obtained by applying, to the surface of a substrate, the aforementioned coating composition according to the present invention.

The coating composition of the present invention may be applied to the surface of a substrate through the application of a conventional coating means or finishing operation properly selected. Any substrate material can be used for the substrate of the coated recording medium according to the present invention as long as a film can be formed on it by applying the coating composition of the invention. Examples of such substrate materials include paper, cloth, wood, metallic plates, and organic materials such as plastics. In the present invention, paper is preferred as the substrate.

EXAMPLES

The present invention will now be explained specifically by referring to the following Examples. However, the present invention is not limited to these examples.

Example 1

100 parts by weight of water, 0.4 parts by weight of a sodium alkylallylsulfosuccinate, and 0.2 parts by weight of polyoxyethylene nonylphenyl ether were charged to a polymerizer. The mixture was stirred to make a solution, and the temperature of the solution was then raised to 75° C. To this solution, 13 parts by weight of a 4% aqueous potassium persulfate solution and an monomer emulsion composition prepared according to the following formulation were added dropwise over two hours to conduct polymerization reaction. After the addition was completed, the reaction system was aged for 1 hour to produce a milky white synthetic resin emulsion.

| Formulation of Monomer emulsion Composition | |
| --- | --- |
| Water | 50 parts by weight |
| Polyoxyethylene nonylphenyl ether | 0.2 parts by weight |
| Sodium alkylallylsulfosuccinate | 1.0 part by weight |
| Styrene | 5 parts by weight |
| Methyl methacrylate | 20 parts by weight |
| Butyl acrylate | 55 parts by weight |
| 2-Hydroxyethyl acrylate | 5 parts by weight |
| Methacrylic acid | 15 parts by weight |
| Vinyltriethoxysilane | 2 parts by weight |

70 parts by weight of water was added to this synthetic resin emulsion with stirring to decrease the viscosity of the emulsion. This emulsion was neutralized over 1 hour by adding thereto 30 parts by weight of a 5% aqueous sodium hydroxide solution, thereby transforming the emulsion into a hydrosol. Thus, a semitransparent aqueous hydrosol emulsion was obtained.

Next, 100 parts by weight of colloidal silica whose particle surface had been treated with aluminate ion was added to and thoroughly mixed with the above hydrosol emulsion to obtain a coating composition.

Example 2

The procedure of Example 1 was repeated except that an monomer emulsion composition prepared according to the following formulation was used instead of the one used in Example 1.

| Formulation of Monomer emulsion Composition | |
| --- | --- |
| Water | 50 parts by weight |
| Polyoxyethylene nonylphenyl ether | 0.2 parts by weight |
| Sodium alkylallylsulfosuccinate | 1.0 part by weight |
| Styrene | 3 parts by weight |
| Methyl methacrylate | 35 parts by weight |
| Butyl acrylate | 44 parts by weight |
| 2-Hydroxyethyl acrylate | 8 parts by weight |
| Methacrylic acid | 10 parts by weight |
| Vinyltriethoxysilane | 2 parts by weight |

Example 3

The procedure of Example 1 was repeated except that an monomer emulsion composition prepared according to the following formulation was used instead of the one used in Example 1.

| Formulation of Monomer emulsion Composition | |
|---|---|
| Water | 50 parts by weight |
| Polyoxyethylene nonylphenyl ether | 0.2 parts by weight |
| Sodium alkylallylsulfosuccinate | 1.0 part by weight |
| Styrene | 10 parts by weight |
| Methyl methacrylate | 35 parts by weight |
| Butyl acrylate | 37 parts by weight |
| 2-Hydroxyethyl acrylate | 3 parts by weight |
| Methacrylic acid | 15 parts by weight |
| γ-Methacryloxypropyltriethoxysilane | 2 parts by weight |

Example 4

The procedure of Example 1 was repeated except that the alkali used for neutralizing the synthetic resin emulsion to form the hydrosol emulsion was changed from the 5% aqueous sodium hydroxide solution to 5% aqueous ammonia.

Example 5

The procedure of Example 4 was repeated except that the amount of the vinyltriethoxysilane used for preparing the monomer emulsion composition was changed from 2 parts by weight to 4 parts by weight and that the amount of the colloidal silica was changed to 50 parts by weight.

Example 6

The procedure of Example 4 was repeated except that an monomer emulsion composition prepared according to the following formulation was used instead of the one used in Example 4 and that the amount of the colloidal silica was changed to 150 parts by weight.

| Formulation of Monomer emulsion Composition | |
|---|---|
| Water | 50 parts by weight |
| Polyoxyethylene nonylphenyl ether | 0.2 parts by weight |
| Sodium alkylallylsulfosuccinate | 1.0 part by weight |
| Cyclohexyl methacrylate | 10 parts by weight |
| Methyl methacrylate | 50 parts by weight |
| Butyl acrylate | 20 parts by weight |
| 2-Hydroxyethyl acrylate | 5 parts by weight |
| Methacrylic acid | 15 parts by weight |
| Vinyltriethoxysilane | 2 parts by weight |

Example 7

The procedure of Example 4 was repeated except that an monomer emulsion composition prepared according to the following formulation was used instead of the one used in Example 4.

| Formulation of Monomer emulsion Composition | |
|---|---|
| Water | 50 parts by weight |
| Polyoxyethylene nonylphenyl ether | 0.2 parts by weight |
| Sodium alkylallylsulfosuccinate | 1.0 part by weight |
| Methyl methacrylate | 73 parts by weight |
| Butyl acrylate | 17 parts by weight |
| Methacrylic acid | 10 parts by weight |
| Vinyltriethoxysilane | 2 parts by weight |

Example 8

The procedure of Example 4 was repeated except that an monomer emulsion composition prepared according to the following formulation was used instead of the one used in Example 4 and that 2 parts by weight of γ-glycidoxypropyltrimethoxysilane was added to the synthetic resin emulsion obtained.

| Formulation of Monomer emulsion Composition | |
|---|---|
| Water | 50 parts by weight |
| Polyoxyethylene nonylphenyl ether | 0.2 parts by weight |
| Sodium alkylallylsulfosuccinate | 1.0 part by weight |
| Styrene | 20 parts by weight |
| Methyl methacrylate | 63 parts by weight |
| Butyl acrylate | 7 parts by weight |
| Methacrylic acid | 10 parts by weight |

The formulations of the coating compositions of the above examples are shown in Table 1, provided that those components that are common to all these formulations are omitted.

TABLE 1

| | Example 1 | Example 2 | Example 3 | Example 4 | Example 5 | Example 6 | Example 7 | Example 8 |
|---|---|---|---|---|---|---|---|---|
| Styren | 5 | 3 | 10 | 5 | 5 | — | — | 20 |
| Cyclohexyl methacrylate | — | — | — | — | — | 10 | — | — |
| Methyl methacrylate | 20 | 35 | 35 | 20 | 35 | 50 | 73 | 63 |
| Butyl acrylate | 55 | 44 | 37 | 55 | 55 | 20 | 17 | 7 |
| Methacrylic acid | 15 | 10 | 15 | 15 | 15 | 15 | 10 | 10 |
| 2-Hydroxyethyl methacrylate | 5 | 8 | 3 | 5 | 5 | 5 | — | — |
| Vinylsilane | 2 | 2 | 2 | 2 | 4 | 2 | 2 | 2 |
| Neutralization treatment with alkali | Sodium hydroxide | | | | | Ammonia | | |
| Colloidal silica | 100 | 100 | 100 | 100 | 50 | 150 | 100 | 100 |

Comparative Example 1

The procedure of Example 4 was repeated except that an monomer emulsion composition prepared according to the following formulation was used instead of the one used in Example 4 and that the synthetic resin emulsion produced was not neutralized with an alkali and thus not transformed into a hydrosol.

| Formulation of Monomer emulsion Composition | |
| --- | --- |
| Water | 50 parts by weight |
| Polyoxyethylene nonylphenyl ether | 0.2 parts by weight |
| Sodium alkylallylsulfosuccinate | 1.0 part by weight |
| Styrene | 5 parts by weight |
| Methyl methacrylate | 25 parts by weight |
| Butyl acrylate | 65 parts by weight |
| 2-Hydroxyethyl acrylate | 5 parts by weight |
| Vinyltriethoxysilane | 2 parts by weight |

Comparative Example 2

The procedure of Example 1 was repeated except that an monomer emulsion composition prepared according to the following formulation was used instead of the one used in Example 1 and that the synthetic resin emulsion produced was not neutralized with an alkali and thus not transformed into a hydrosol.

| Formulation of Monomer emulsion Composition | |
| --- | --- |
| Water | 50 parts by weight |
| Polyoxyethylene nonylphenyl ether | 0.2 parts by weight |
| Sodium alkylallylsulfosuccinate | 1.0 part by weight |
| Styrene | 10 parts by weight |
| Methyl methacrylate | 32 parts by weight |
| Butyl acrylate | 43 parts by weight |
| Methacrylic acid | 15 parts by weight |
| Vinyltriethoxysilane | 2 parts by weight |

Comparative Example 3

The procedure of Example 1 was repeated except that the synthetic resin emulsion produced was not neutralized with an alkali and thus not transformed into a hydrosol and that the colloidal silica was not used.

Comparative Example 4

The procedure of Example 1 was repeated except that an monomer emulsion composition prepared according to the following formulation was used instead of the one used in Example 1, that the colloidal silica was not used and that 5% aqueous ammonia was used instead of the 5% aqueous sodium hydroxide solution used in Example 1.

| Formulation of Monomer emulsion Composition | |
| --- | --- |
| Water | 50 parts by weight |
| Polyoxyethylene nonylphenyl ether | 0.2 parts by weight |
| Sodium alkylallylsulfosuccinate | 1.0 part by weight |
| Styrene | 5 parts by weight |
| Methyl methacrylate | 35 parts by weight |
| Butyl acrylate | 45 parts by weight |
| 2-Hydroxyethyl acrylate | 5 parts by weight |
| Methacrylic acid | 10 parts by weight |

Comparative Example 5

The procedure of Example 4 was repeated except that an monomer emulsion composition prepared according to the following formulation was used instead of the one used in Example 4 and that 5% aqueous ammonia was used instead of the 5% aqueous sodium hydroxide solution used in Example 4.

| Formulation of Monomer emulsion Composition | |
| --- | --- |
| Water | 50 parts by weight |
| Polyoxyethylene nonylphenyl ether | 0.2 parts by weight |
| Sodium alkylallylsulfosuccinate | 1.0 part by weight |
| Styrene | 10 parts by weight |
| Methyl methacrylate | 25 parts by weight |
| Butyl acrylate | 65 parts by weight |
| Vinyltrimethoxysilane | 2 parts by weight |

The formulations of the coating compositions of the above Comparative Examples are shown in Table 2, provided that those components that are common to all these formulations are omitted.

TABLE 2

| | Example 1 | Example 2 | Example 3 | Example 4 | Example 5 |
| --- | --- | --- | --- | --- | --- |
| Styren | 5 | 10 | 5 | 5 | 10 |
| Cyclohexyl methacrylate | — | — | — | — | — |
| Methyl methacrylate | 25 | 32 | 20 | 35 | 25 |
| Butyl acrylate | 65 | 43 | 55 | 45 | 65 |
| Methacrylic acid | — | 15 | 15 | 10 | — |
| 2-Hydroxyethyl methacrylate | 5 | — | 5 | 5 | — |
| Vinylsilane | 2 | 2 | — | — | 2 |
| Neutralization treatment with alkali | | Not treated | | | Ammonia |
| Colloidal silica | 100 | 100 | 0 | 0 | 100 |

The coating compositions of Examples and those of Comparative Examples were subjected to the following evaluation tests.

Evaluation Test for Water Resistance

Each one of the coating compositions was applied to a glass plate with a coater (applicator) having grooves of 0.3 mm, and dried at 105° C. for 5 minutes to form a film on the glass plate. This coating film was immersed in water. After 1 hour, the condition of the film was visually observed, and evaluated in accordance with the following criteria:

○: The film is in such a state that it is undissolved and not separated from the glass plate;

Δ: The film is in such a state that it is undissolved but partly separated from the glass plate; and ×: The film is in such a state that it has dissolved or is separated from the glass plate.

Evaluation Test for Alkali-solubility

A film was formed on a glass plate in the same manner as in the above Evaluation Test for Water Resistance. This film was immersed in a 10% aqueous sodium hydroxide solution. After 30 minutes, the condition of the film was visually observed, and evaluated in accordance with the following criteria:

○: The film is in such a state that it has dissolved or is separated from the glass plate;

Δ: The film is in such a state that it is undissolved, but partly separated from the glass plate; and ×: The film is in such a state that it is undissolved and not separated from the glass plate.

Evaluation Test for Heat Resistance

Each one of the coating compositions was applied to fine-quality paper with a wire coater No. 10, and dried at 105° C. for 3 minutes to make coated paper. Two sheets of this coated paper were superposed with the coated surfaces facing each other, and thermally pressed by a thermal gradient tester (Type HG-100) manufactured by Toyo Seiki Co., Ltd., Japan at 200° C. for 10 seconds under a load of 1 kg. After pressing, the sheets were separated from each other at the surfaces faced. The condition of the sheets was visually observed, and evaluated in accordance with the following criteria:

○: The sheets are in such a state that they are separated without causing blocking; and ×: The sheets are in such a state that they have caused blocking and remain adhered to each other.

Evaluation Test for Glossiness

Each one of the coating compositions was applied to a 30-cm square black-colored vinyl chloride tile in an amount of 15 ml/m², and then dried at 80° C. for 10 minutes. The specular gloss of each tile for a gloss meter geometry of 60° was measured by a gloss meter (Model TC-108D) manufactured by Tokyo Denshoku Co., Ltd. Japan.

The results of the above-described evaluation tests are shown in Tables 3 and 4.

TABLE 4

| Evaluation Test | Example 1 | Example 2 | Example 3 | Example 4 | Example 5 |
|---|---|---|---|---|---|
| Water Resistance | Δ | X | X | Δ | ○ |
| Alkali-Solubility | X | Δ | Δ | ○ | X |
| Heat Resistance | ○ | ○ | X | X | ○ |
| Gloss | 56 | 55 | 56 | 58 | 56 |

What is claimed is:

1. A coating composition comprising: a hydrosol emulsion and colloidal silica, wherein the hydrosol emulsion is obtained by neutralizing, with an alkali, a synthetic resin emulsion prepared by dispersing, in water, particles of a synthetic resin having carboxyl group and an alkoxysilyl group.

2. The coating composition according to claim 1, wherein the particles of a synthetic resin contained in the synthetic resin emulsion further contains hydroxyl group.

3. The coating composition according to claim 1, wherein the polymer contained in the hydrosol emulsion has a glass transition temperature (Tg) of 0 to 100° C.

4. The coating composition according to claims 1, wherein the synthetic resin emulsion is prepared either by subjecting, at least, a (meth)acrylic alkyl ester, an ethylenically unsaturated carboxylic acid and an organoalkoxysilane having radically polymerizable unsaturated bond to emulsion polymerization, or by subjecting, at least, a (meth) acrylic alkyl ester and an ethylenically unsaturated carboxylic acid to emulsion polymerization, and mixing the polymer produced and an organoalkoxysilane having no radically polymerizable unsaturated bond.

5. The coating composition according to claim 4, wherein the ethylenically unsaturated carboxylic acid is used in an amount of 5 to 30 parts by weight for 100 parts by weight of the nonvolatile matter of the hydrosol emulsion.

6. The coating composition according to claim 4 wherein the organoalkoxysilane is used in an amount of 0.1 to 10 parts by weight for 100 parts by weight of the nonvolatile matter of the hydrosol emulsion.

7. The coating composition according to claim 1, wherein the colloidal silica is used in an amount of 10 to 200 parts by weight for 100 parts by weight of the nonvolatile matter of the hydrosol emulsion.

8. A coated recording medium produced by applying, to the surface of a substrate, a coating composition according to claim 1.

9. A process for producing a coating composition comprising:

preparing a synthetic resin emulsion by dispersing, in water, particles of a synthetic resin having carboxyl group and an alkoxysilyl group,

TABLE 3

| Evaluation Test | Example 1 | Example 2 | Example 3 | Example 4 | Example 5 | Example 6 | Example 7 | Example 8 |
|---|---|---|---|---|---|---|---|---|
| Water Resistance | ○~Δ | ○~Δ | ○~Δ | ○ | ○ | ○ | ○ | ○ |
| Alkali-Solubility | ○ | ○ | ○ | ○ | ○ | ○ | ○ | ○ |
| Heat Resistance | ○ | ○ | ○ | ○ | ○ | ○ | ○ | ○ |
| Gloss | 68 | 64 | 62 | 64 | 62 | 61 | 61 | 63 | neutralizing the synthetic resin emulsion with an alkali to form a hydrosol emulsion, and mixing the hydrosol emulsion with colloidal silica.

10. The process according to claim 9, wherein the synthetic resin emulsion is prepared by subjecting, at least, a (meth)acrylic alkyl ester, an ethylenically unsaturated carboxylic acid, and an organoalkoxysilane having radically polymerizable unsaturated bond to emulsion polymerization.

11. The process according to claim 9, wherein the synthetic resin emulsion is prepared by subjecting, at least, a (meth)acrylic alkyl ester and an ethylenically unsaturated carboxylic acid to emulsion polymerization, and mixing the polymer produced and an organoalkoxysilane having no radically polymerizable unsaturated bond.

* * * * *